US008425781B2

(12) United States Patent
Hines et al.

(10) Patent No.: US 8,425,781 B2
(45) Date of Patent: Apr. 23, 2013

(54) MATERIALS AND PROCESS FOR ENHANCING SELECTIVE SEPARATIONS

(75) Inventors: John B. Hines, Atlanta, GA (US); Brian L. Swift, Oxford, GA (US); Pablo G. Dopico, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 392 days.

(21) Appl. No.: 12/479,087

(22) Filed: Jun. 5, 2009

(65) Prior Publication Data

US 2009/0301972 A1 Dec. 10, 2009

Related U.S. Application Data

(60) Provisional application No. 61/059,146, filed on Jun. 5, 2008.

(51) Int. Cl.
| | |
|---|---|
| *B03D 101/06* | (2006.01) |
| *B03D 1/001* | (2006.01) |
| *C02F 1/24* | (2006.01) |
| *C02F 1/52* | (2006.01) |
| *C02F 1/00* | (2006.01) |

(52) U.S. Cl.
USPC ........... 210/705; 210/696; 210/723; 210/729; 210/730; 210/731; 209/167; 516/9

(58) Field of Classification Search .................. None
See application file for complete search history.

(56) References Cited

U.S. PATENT DOCUMENTS

| | | | | |
|---|---|---|---|---|
| 1,801,052 | A | | 4/1931 | Meigs |
| 1,801,053 | A | | 4/1931 | Meigs |
| 2,696,912 | A | * | 12/1954 | Atwood et al. ............... 209/166 |
| 3,575,797 | A | * | 4/1971 | Lehmann et al. ............ 162/189 |
| 4,339,331 | A | * | 7/1982 | Lim et al. ...................... 209/167 |
| 2006/0151397 | A1 | * | 7/2006 | Wright et al. ................. 210/704 |
| 2007/0000839 | A1 | | 1/2007 | Wright et al. |
| 2007/0027283 | A1 | | 2/2007 | Swift et al. |
| 2007/0107859 | A1 | * | 5/2007 | Rosencrance et al. ............ 162/5 |
| 2007/0123679 | A1 | | 5/2007 | Swift et al. |
| 2007/0123680 | A1 | | 5/2007 | Swift et al. |
| 2007/0142596 | A1 | | 6/2007 | Swift et al. |
| 2009/0065736 | A1 | * | 3/2009 | Johnson et al. ............... 252/88.1 |

FOREIGN PATENT DOCUMENTS

| | | |
|---|---|---|
| EP | 1652861 A1 | 5/2006 |
| JP | 11009190 A | 1/1999 |
| SU | 724203 A1 | 3/1980 |

OTHER PUBLICATIONS

V. Subramanian et al., "Note on the Soluble Sugars of Sorghum", 1980, Internation Crops Research Institute for the Semi-Arid Tropics.*
International Search Report and Written Opinion of the International Searching Authority, mailed Feb. 25, 2010, ten pages, European Patent Office, Rijswijk, Netherlands.
Lange's Handbook of Chemistry (John A. Dean, ed), 1985, pp. 7-9 through 7-10, Thirteenth Edition, McGraw-Hill Book Company, New York, NY, USA.
Jennifer M. Ames, The Maillard browning reaction—an update, Chemistry and Industry, Sep. 5, 1988, pp. 558-561, Issue No. 1, London, Great Britain.
Reagents in Mining Technology, Surfactant Science Series, 1988, p. 472, vol. 27, Marcel Dekker, Inc., New York, USA.
Eva Kaminski, Isolation and Identification of Nonvolatile Water Soluble Maillard Reaction Products, Thesis, 1997, p. 13, McGill University, Montreal, Canada.
Donald L. Sparks, Environmental Soil Chemistry, 2003, pp. 111-113, Academic Press.
Harry Nursten, The Maillard Reaction, 2005, pp. 2-4, RSC, Reading, United Kingdom.
European Patent Office, Partial International Search for PCT/US2009/046386, mailed Oct. 23, 2009, Rijswijk, Netherlands.

* cited by examiner

*Primary Examiner* — Benjamin Kurtz
(74) *Attorney, Agent, or Firm* — Ram W. Sabnis

(57) ABSTRACT

Use of a Maillard reaction product as an adjuvant in a variety of applications including solid-liquid separations, corrosion inhibition, emulsification, dust suppression, slow release fertilization, viscosity modification and others and especially as a depressant or collector in separation processes, including the selective separation of solids and/or ionic species from aqueous media, such as in the process of froth flotation.

27 Claims, No Drawings

MATERIALS AND PROCESS FOR ENHANCING SELECTIVE SEPARATIONS

BACKGROUND OF INVENTION

1. Field of Invention

The present invention relates to the use of Maillard reaction products as adjuvants in a variety of applications, including in separation processes, and especially in connection with the selective separation of solids and/or ionic species from aqueous media, such as in the process of flotation. The invention also provides novel materials for use in such applications.

2. Description of Related Art

Flotation is a widely used separation process designed for the recovery or isolation of a valued material present in admixture in a liquid suspension or dispersion (and especially aqueous suspensions or dispersions). Separation is accomplished based on differences in the tendency of various materials to associate with rising gas (usually air) bubbles.

Various additives are commonly incorporated into the flotation liquid (e.g., the aqueous suspension or dispersion) to improve the selectivity of the separation process.

For example, substances identified as "collectors" can be used to chemically and/or physically absorb preferentially onto one of the substances in the suspension or dispersion (often, though not always the valued material in the suspension or dispersion) to render it more hydrophobic and more amenable to flotation.

Conversely, "depressants," are often used in conjunction with collectors, to render other materials in the suspension or dispersion (often though not always the less valued material in the suspension or dispersion, e.g., gangue) less likely to associate with the air bubbles, and therefore less likely to be carried into the froth concentrate and more likely to remain in the underflow or tailings. Various depressants for improving flotation separations are known in the art and include guar gum, sodium silicate, starch, tannins, dextrins, lignosulphonic acids, carboxymethyl cellulose, cyanide salts and others.

Because different substances in the suspension or dispersion are affected differently by the "collector" and/or the "depressant," a degree of separation is obtained by this process.

The manner in which known collectors and depressants achieve their effect is not understood with complete certainty, and several theories have been proposed. Depressants, for example may interfere with or prevent one of the substances in the suspension or dispersion (such as gangue) from adhering to another of the substances in the suspension or dispersion (such as a valued material to be recovered), or the depressant may interfere with or even prevent the collector(s) from absorbing onto one of the substances (such as the gangue). Whatever the mechanism, however, the ability of a depressant to improve the selectivity in a flotation process can very favorably impact the economics of the process.

Flotation is practiced in the beneficiation of a wide variety of valued materials, including the recovery of minerals (e.g., phosphorous and potassium) and metal ores (e.g., platinum group elements), the recovery of high molecular weight hydrocarbons such as bitumen from sand and/or clay, and the separation of coal from its ash content to name a few, to obtain the removal of unwanted contaminants, which are unavoidably co-extracted from natural deposits, from the valued material.

In the case of solid ore beneficiation, the use of flotation generally comprises grinding the crude ore into sufficiently small, discrete particles and then contacting an aqueous "pulp" of this ground ore with rising air bubbles, typically while agitating the pulp. Prior to flotation, the crude ore may be subjected to any number of preconditioning steps, including selective crushing, screening, desliming, gravity concentration, electrical separation, low temperature roasting, and magnetic differentiation.

In addition to flotation, a number of other processes also are designed for the separation of solid contaminants from liquid suspensions or dispersions. Like flotation these other processes also often take advantage of additives that facilitate the desired separation, either by destabilizing the suspension or dispersion, or by otherwise causing contaminants in the suspension or dispersion to form larger agglomerates. Coagulation, for example, refers to the destabilization of suspended solid particles, such as by neutralizing the electric charge that separates them. Flocculation refers to the bridging or agglomeration of solid particles together into clumps or flocs, thereby facilitating their separation by settling or flotation, depending on the density of the flocs relative to the liquid. Otherwise, filtration may be employed as a means to separate the larger flocs.

Flocculants, such as acrylic polymers, find application, for example, in the separation of solid particles of rock or drill cuttings from oil and gas well drilling fluids, for agglomerating clays suspended in the waste slurry effluent from phosphate production facilities, in coal slurry dewatering, for treating sewage to remove contaminants (e.g., sludge) via sedimentation, for processing of pulp and paper mill effluents to remove suspended cellulosic solids, for removing sand from aqueous bitumen-containing slurries generated in the extraction and subsequent processing of oil sands, and for removing suspended solid particulates in the purification of drinking (i.e., potable) water.

The foregoing descriptions are illustrative of specific examples where an aqueous liquid suspension or dispersion is processed to recover, isolate, separate, or purify a desired valued material. Such separations also are common in a number of other water-consuming industries and the present invention is intended to be applicable to the wide variety of treatment options designed to recover, isolate, separate, or purify a desired valued material from unwanted contaminants. It may also be used to remove unwanted contaminants from a liquid, such as in water purification.

In particular, the present invention is directed to the discovery of a variety of new uses for certain known materials, as well as to the discovery of new classes of materials which can be effectively employed in a wide range of applications including, but not limited to a variety of separation processes, including flotation. Applicants have determined that the materials of the present invention have utility as adjuvants for effectively enhancing the performance of a wide variety of processes, such as the selective separation of a wide variety of solid contaminants from liquid suspensions and dispersions.

SUMMARY OF THE INVENTION

In one embodiment, the present invention is directed to a process for obtaining a valued material from an aqueous suspension, dispersion, or solution containing the valued material comprising adding to the aqueous suspension, dispersion, or solution, a Maillard reaction product, the Maillard reaction product comprising an adduct of (1) an amine reactant and (2) a reducing sugar or a reducing sugar equivalent, or a mixture thereof.

In one embodiment, the present invention is directed to specifically to a flotation process for separating a valued material from an aqueous suspension or dispersion containing the valued material comprising adding to the aqueous suspension or dispersion a Maillard reaction product, the Maillard reaction product comprising an adduct of (1), an amine reactant and (2) a reducing sugar or a reducing sugar equivalent, or a mixture thereof.

In one embodiment, the present invention is directed to a process for emulsifying a material comprising agitating the material in a suitable liquid in the presence of a Maillard reaction product, the Maillard reaction product comprising an adduct of (1), an amine reactant and (2) a reducing sugar or a reducing sugar equivalent, or a mixture thereof.

In one embodiment, the present invention is directed to a process for reducing corrosion comprising contacting a material in need of corrosion protection with a Maillard reaction product, the Maillard reaction product comprising an adduct of (1), an amine reactant and (2) a reducing sugar or a reducing sugar equivalent, or a mixture thereof.

In one embodiment, the present invention is directed to a process for suppressing airborne dust comprising contacting a dust generating surface with a Maillard reaction product, the Maillard reaction product comprising an adduct of (1), an amine reactant and (2) a reducing sugar or a reducing sugar equivalent, or a mixture thereof.

In one embodiment, the present invention is directed to a process of slow release fertilization comprising applying a high nitrogen containing Maillard reaction product to soil, the high nitrogen Maillard reaction product comprising an adduct of (1), a high nitrogen amine reactant and (2) a reducing sugar or a reducing sugar equivalent, or a mixture thereof.

In one embodiment, the present invention is directed to a process for reducing the viscosity of a cementitious slurry comprising adding a Maillard reaction product to the slurry, the Maillard reaction product comprising an adduct of (1) an amine reactant and (2) a reducing sugar or a reducing sugar equivalent, or a mixture thereof.

In one embodiment, the present invention is directed to certain Maillard reaction products formed by reacting (1) an amine reactant and (2) a reducing sugar or a reducing sugar equivalent, or a mixture thereof, wherein the amine reactant is selected from a fatty amine.

In one embodiment, the present invention is directed to certain Maillard reaction products formed by reacting (1) an amine reactant and (2) a reducing sugar or a reducing sugar equivalent, or a mixture thereof, wherein the Maillard reaction product has high cationic functionality.

In one embodiment, the present invention is directed to certain Maillard reaction products formed by reacting (1) an amine reactant and (2) a reducing sugar or a reducing sugar equivalent, or a mixture thereof, wherein the Maillard reaction product has sulfur functionality.

In one embodiment, the present invention is directed to certain Maillard reaction products formed by reacting (1) an amine reactant and (2) a reducing sugar or a reducing sugar equivalent, or a mixture thereof, wherein the Maillard reaction product has phosphorus functionality.

In one embodiment, the present invention is directed to certain Maillard reaction products formed by reacting (1) an amine reactant and (2) a reducing sugar or a reducing sugar equivalent, or a mixture thereof, wherein the Maillard reaction product has sulfate or sulfonate functionality.

In one embodiment, the present invention is directed to certain Maillard reaction products formed by reacting (1) an amine reactant and (2) a reducing sugar or a reducing sugar equivalent, or a mixture thereof, wherein the Maillard reaction product has hydroxamic acid functionality.

In one embodiment, the present invention is directed to certain Maillard reaction products formed by reacting (1) an amine reactant and (2) a reducing sugar or a reducing sugar equivalent, or a mixture thereof, wherein the Maillard reaction products have silane functionality.

In one embodiment, the present invention is directed to certain Maillard reaction products formed by reacting (1) an amine reactant and (2) a reducing sugar or a reducing sugar equivalent, or a mixture thereof, wherein the Maillard reaction products have phenolic functionality.

In one embodiment, the present invention is directed to certain Maillard reaction products formed by reacting (1) an amine reactant and (2) a reducing sugar or a reducing sugar equivalent, or a mixture thereof, wherein the Maillard reaction products have aza crown chelating functionality.

DETAILED DESCRIPTION OF THE INVENTION

The present invention is based on the discovery that Maillard reaction products formed by reacting (1) an amine reactant and (2) a reducing sugar, a reducing sugar equivalent or a mixture thereof can effectively be employed as an adjuvant for a wide variety of applications including, solid-liquid separations, corrosion inhibition, emulsification, dust suppression, slow release fertilization, viscosity modification and others. In particular, the Maillard reaction products have specific utility in a wide range of separation processes, including flotation, to promote a selective separation of a wide variety of valued materials from a wide variety of solid contaminants found in liquid suspensions or dispersions.

The separation processes described herein are applicable to "suspensions" and dispersions as well as to "slurries" of solid particles. These terms are sometimes defined equivalently and sometimes are distinguished based on the need for the input of at least some agitation or energy to maintain homogeneity in the case of a "slurry." Because the methods of the present invention, described herein, are applicable broadly to the separation of solids and solid particles from aqueous media, the terms "suspension" and "dispersions" are considered interchangeable with "slurry" (and vice versa) in the present specification and appended claims.

In its normal usage, a Maillard reaction is a chemical reaction between an amino acid (one category of an amine reactant) and a reducing sugar that often requires added heat to promote the reaction. It is known to involve a non-enzymatic browning where a reactive carbonyl group of the reducing sugar reacts with the nucleophilic amino group of the amino acid. The resulting products include a wide variety of poorly characterized molecular species, including certain high molecular weight heterogeneous polymers, generally identified as melanoidins.

As noted, the present invention focuses on the use Maillard reaction products as an adjuvant for a wide variety of applications including, solid-liquid separations, corrosion inhibition, emulsification, dust suppression, slow release fertilization, viscosity modification and others. The Maillard reaction products are prepared by a reaction between (1) an amine reactant and (2) a reducing sugar, a reducing sugar equivalent, or a mixture thereof.

Broadly, amine reactants suitable for forming Maillard reaction products used in the present invention include almost any compound that has one or more reactive amino groups, i.e., an amino group available for reaction with a reducing sugar, a reducing sugar equivalent, or a mixture thereof. Compounds which have (or which function as though they have) more than one reactive amino group provide more flexibility in the synthesis of useful Maillard reaction products. Suitable reactive amino groups can be classified as a primary amino groups (i.e., —NH$_2$) and secondary amino groups (i.e., —NHR), where R can be any moiety that does not interfere with the Maillard reaction.

Amine reactants thus include ammonia, hydrazine, guanidine, primary amines (e.g., compounds generally having the formula NH$_2$R$^1$), secondary amines (e.g., compounds generally having the formula NHR$^1$R$^2$), quaternary ammonium compounds (e.g., compounds generally having a group of the formula (NH$_4$)$^+$, (NH$_3$R$^1$)$^+$ and (NH$_2$R$^1$R$^2$)$^+$ and a related anion), polyamines (compounds having multiple primary and/or secondary nitrogen moieties (i.e., reactive amino groups) not strictly embraced by the foregoing formulae), amino acids, and proteins, where R$^1$ and R$^2$ in the amines and quaternary ammonium compounds are each selected (independently in the case of (NHR$^1$R$^2$) and (NH$_2$R$^1$R$^2$)$^-$) from hydroxyl, alkyl, alkenyl, alkynyl, cycloalkyl, aryl, heterocyclic, and heteroaryl groups (as defined hereinafter).

"Alkyl" (monovalent) when used alone or as part of another term (e.g., alkoxy) means an optionally substituted branched or unbranched, saturated aliphatic hydrocarbon group, having up to 25 carbon atoms unless otherwise specified. Examples of particular unsubstituted alkyl groups include, but are not limited to, methyl, ethyl, n-propyl, isopropyl, n-butyl, iso-butyl, sec-butyl, tert-butyl, n-pentyl, 2-methylbutyl, 2,2-dimethylpropyl, n-hexyl, 2-methylpentyl, 2,2-dimethylbutyl, n-heptyl, 3-heptyl, 2-methylhexyl, and the like. The terms "lower alkyl", "C$_1$-C$_4$ alkyl" and "alkyl of 1 to 4 carbon atoms" are synonymous and used interchangeably to mean methyl, ethyl, 1-propyl, isopropyl, cyclopropyl, 1-butyl, sec-butyl or t-butyl. As noted, the term alkyl includes both "unsubstituted alkyls" and "substituted alkyls," (i.e., optionally substituted unless the context clearly indicates otherwise) the latter of which refers to alkyl moieties having substituents replacing one or more hydrogens on one or more (often no more than four) carbon atoms of the hydrocarbon backbone and generally only one susbstituent on one or two carbon atoms. Such substituents are independently selected from the group consisting of: halo (e.g., I, Br, Cl, F), hydroxy, amino, cyano, alkoxy (such as C$_1$-C$_6$ alkoxy), aryloxy (such as phenoxy), nitro, carboxyl, oxo, carbamoyl, cycloalkyl, aryl (e.g., aralkyls or arylalkyls), heterocyclic, and heteroaryl. Exemplary substituted alkyl groups include hydroxymethyl, aminomethyl, carboxymethyl, carboxyethyl, carboxypropyl, acetyl (where the two hydrogen atoms on the —CH$_2$ portion of an ethyl group are replaced by an oxo (═O), methoxyethyl, and 3-hydroxypentyl. Particular substituted alkyls are substituted methyl groups. Examples of substituted methyl group include groups such as hydroxymethyl, acetoxymethyl, aminomethyl, carbamoyloxymethyl, chloromethyl, carboxymethyl, carboxyl (where the three hydrogen atoms on the methyl are replaced, two hydrogens are replaced by an oxo (═O) and the other hydrogen is replaced by a hydroxy (—OH), bromomethyl and iodomethyl.

"Alkenyl" when used alone or as part of another term means an optionally substituted unsaturated hydrocarbon group containing at least one carbon-carbon double bond, typically 1 or 2 carbon-carbon double bonds, and which may be linear or branched. Representative alkenyl groups include, by way of example, vinyl, allyl, isopropenyl, but-2-enyl, n-pent-2-enyl, and n-hex-2-enyl. As noted, the term alkenyl includes both "unsubstituted alkenyls" and "substituted alkenyls," (i.e., optionally substituted unless the context clearly indicates otherwise). The substituted versions refer to alkenyl moieties having substituents replacing one or more hydrogens on one or more (often no more than four) carbon atoms of the hydrocarbon backbone and generally only one susbstituent on one or two carbon atoms. Such substituents are independently selected from the group consisting of: halo (e.g., I, Br, Cl, F), hydroxy, amino, alkoxy (such as C$_1$-C$_6$ alkoxy), aryloxy (such as phenoxy), carboxyl, oxo, cyano, nitro, carbamoyl, cycloalkyl, aryl (e.g., aralkyls), heterocyclic, and heteroaryl.

Alkynyl when used alone or as part of another term means an optionally substituted unsaturated hydrocarbon group containing at least one carbon-carbon triple bond, typically 1 or 2 carbon-carbon triple bonds, and which may be linear or branched. Representative alkynyl groups include, by way of example, ethynyl; 1-, or 2-propynyl; 1-, 2-, or 3-butynyl, or 1,3-butdiynyl; 1-, 2-, 3-, 4-pentynyl, or 1,3-pentdiynyl; 1-, 2-, 3-, 4-, or 5-henynyl, or 1,3-hexdiynyl or 1,3,5-hextriynyl; 1-, 2-, 3-, 4-, 5- or 6-heptynyl, or 1,3-heptdiynyl, or 1,3,5-hepttriynyl; 1-, 2-, 3-, 4-,5-, 6- or 7-octynyl, or 1,3-octdiynyl, and 1,3,5-octtriynyl. As noted, the term alkynyl includes both "unsubstituted alkynyl" and "substituted alkynyl," (i.e., optionally substituted unless the context clearly indicates otherwise). The substituted versions refer to alkynyl moieties having substituents replacing one or more hydrogens on one or more (often no more than four) carbon atoms of the hydrocarbon backbone and generally only one susbstituent on one or two carbon atoms. Such substituents are independently selected from the group consisting of: halo (e.g., I, Br, Cl, F), hydroxy, amino, alkoxy (such as C$_1$-C$_6$ alkoxy), aryloxy (such as phenoxy), carboxyl, oxo, cyano, nitro, carbamoyl, cycloalkyl, aryl (e.g., aralkyls), heterocyclic, and heteroaryl.

"Cycloalkyl" when used alone or as part of another term means an optionally substituted saturated or partially unsaturated cyclic aliphatic (i.e., non-aromatic) hydrocarbon group (carbocycle group), having up to 12 carbon atoms unless otherwise specified and includes cyclic and polycyclic, including fused cycloalkyl. As noted, the term cycloalkyl includes both "unsubstituted cycloalkyls" and "substituted cycloalkyls," (i.e., optionally substituted unless the context clearly indicates otherwise) the latter of which refers to cycloalkyl moieties having substituents replacing one or more hydrogens on one or more (often no more than four) carbon atoms of the hydrocarbon backbone and generally only one susbstituent on one or two carbon atoms. Such substituents are independently selected from the group consisting of: halo (e.g., I, Br, Cl, F), hydroxy, amino, alkoxy (such as C$_1$-C$_6$ alkoxy), aryloxy (such as phenoxy), carboxyl, oxo, cyano, nitro, carbamoyl, alkyl (including substituted alkyls), aryl, heterocyclic, and heteroaryl. Examples of cycloalkyls include cyclopropyl, cyclobutyl, cyclopentyl, cyclohexyl, tetrahydronaphthyl and indanyl.

"Aryl" when used alone or as part of another term means an optionally substituted aromatic carbocyclic group whether or not fused having the number of carbon atoms designated or if no number is designated, from 6 up to 14 carbon atoms. Particular aryl groups include phenyl, naphthyl, biphenyl, phenanthrenyl, naphthacenyl, and the like (see e. g. Lang's Handbook of Chemistry (Dean, J. A., ed) 13$^{th}$ ed. Table 7-2 [1985]). Phenyl groups are generally preferred. As noted, the term aryl includes both "unsubstituted aryls" and "substituted aryls" (i.e., optionally substituted unless the context clearly indicates otherwise), the latter of which refers to aryl moieties having substituents replacing one or more hydrogens on one or more (usually no more than six) carbon atoms of the hydrocarbon core and generally only one susbstituent on one or two carbon atoms. Such substituents are independently selected from the group consisting of: halo (e.g., I, Br, Cl, F), hydroxy, amino, alkoxy (such as C$_1$-C$_6$ alkoxy), aryloxy (such as phenoxy), carboxyl, oxo, cyano, nitro, carbamoyl, alkyl, aryl, heterocyclic and heteroaryl. Examples of such substituted aryls, e.g., substituted phenyls include but are not limited to a mono- or di(halo)phenyl group such as 2-chlorophenyl, 2-bromophenyl, 4-chlorophenyl, 2,6-dichlorophenyl, 2,5-dichlorophenyl, 3,4-dichlorophenyl, 3-chlorophenyl, 3-bromophenyl, 4-bromophenyl, 3,4-dibromophenyl, 3-chloro-4-fluorophenyl, 2-fluorophenyl; a mono- or di(hydroxy)phenyl group such as 4-hydroxyphenyl, 3-hydroxyphenyl, 2,4-dihydroxyphenyl, a mono- or di(lower alkyl) phenyl group such as 4-methylphenyl, 2,4-dimethylphenyl, 2-methylphenyl, 4-(iso-propyl)phenyl, 4-ethylphenyl, 3-(n-propyl)phenyl; a mono or di(alkoxy)phenyl group, for example, 3,4-dimethoxyphenyl, 3-methoxy-4-benzyloxyphenyl, 3-methoxy-4-(1-chloromethyl)benzyloxy-phenyl, 3-ethoxyphenyl, 4-(isopropoxy)phenyl, 4-(t-butoxy)phenyl, 3-ethoxy-4-methoxyphenyl; 3- or 4-trifluoromethylphenyl; a mono- or dicarboxyphenyl or (protected carboxy)phenyl group such 4-carboxyphenyl; a mono- or di(hydroxymethyl) phenyl or 3,4-di(hydroxymethyl)phenyl; a mono- or di(aminomethyl)phenyl or 2-(aminomethyl)phenyl. The aryl groups may have amine functionality (amino) such that the amine reactant is a diaminobenzene or diaminobenzene sulfonic acid, diaminotoluene, diaminonaphthalene, diaminonaphthalene sulfonic acid, and numerous others.

"Heterocyclic group", "heterocyclic", "heterocycle", "heterocyclic", "heterocycloalkyl" or "heterocyclo" alone and when used as a moiety in a complex group, are used interchangeably and refer to any cycloalkyl group, i.e., mono-, bi-, or tricyclic, saturated or unsaturated, non-aromatic and optionally substituted hetero-atom-containing ring systems having the number of atoms designated, or if no number is specifically designated then from 5 to about 14 atoms, where the ring atoms are carbon and at least one heteroatom and usually not more than four (nitrogen, sulfur or oxygen). Included in the definition are any bicyclic groups where any of the above heterocyclic rings are fused to an aromatic ring (i.e., an aryl (e.g., benzene) or a heteroaryl ring). In a particular embodiment the group incorporates 1 to 4 heteroatoms. Typically, a 5-membered ring has 0 to 1 double bonds and 6- or 7-membered ring has 0 to 2 double bonds and the nitrogen or sulfur heteroatoms may optionally be oxidized (e. g. SO, $SO_2$), and any nitrogen heteroatom may optionally be quaternized. Particular non-aromatic heterocycles include morpholinyl(morpholino), pyrrolidinyl, oxiranyl, indolinyl, isoindolinyl, tetrahydroquinolinyl, tetrahydroisoquinolinyl, oxetanyl, tetrahydrofuranyl, 2,3-dihydrofuranyl, 2H-pyranyl, tetrahydropyranyl, aziridinyl, azetidinyl, 1-methyl-2-pyrrolyl, piperazinyl and piperidinyl. As noted, the term heterocyclo includes both "unsubstituted heterocyclos" and "substituted heterocyclos" (i.e., optionally substituted unless the context clearly indicates otherwise), the latter of which refers to heterocyclo moieties having substituents replacing one or more hydrogens on one or more (usually no more than six) atoms of the heterocyclo core and generally only one susbstituent on one or two carbon atoms. Such substituents are independently selected from the group consisting of: halo (e.g., I, Br, Cl, F), hydroxy, amino, alkoxy (such as $C_1$-$C_6$ alkoxy), aryloxy (such as phenoxy), carboxyl, oxo, cyano, nitro, carbamoyl, and alkyl.

"Heteroaryl" alone and when used as a moiety in a complex group refers to any aryl group, i.e., mono-, bi-, or tricyclic, optionally substituted aromatic ring system having the number of atoms designated, or if no number is specifically designated then at least one ring is a 5-, 6- or 7-membered ring and the total number of atoms is from 5 to about 14 and containing from one to four heteroatoms selected from the group consisting of nitrogen, oxygen, and sulfur (Lang's Handbook of Chemistry, supra). Included in the definition are any bicyclic groups where any of the above heteroaryl rings are fused to a benzene ring. The following ring systems are examples of the heteroaryl (whether substituted or unsubstituted) groups denoted by the term "heteroaryl": thienyl (alternatively called thiophenyl), furyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo[1,5-b]pyridazinyl and purinyl, as well as benzo-fused derivatives, for example benzoxazolyl, benzofuryl, benzothienyl, benzothiazolyl, benzothiadiazolyl, benzotriazolyl, benzoimidazolyl and indolyl. As noted, the term heteroaryl includes both "unsubstituted heteroaryls" and "substituted heteroaryls" (i.e., optionally substituted unless the context clearly indicates otherwise), the latter of which refers to heteroaryl moieties having substituents replacing one or more hydrogens on one or more (usually no more than six) atoms of the heteroaryl backbone. Such substituents are independently selected from the group consisting of: halo (e.g., I, Br, Cl, F), hydroxy, amino, alkoxy (such as $C_1$-$C_6$ alkoxy), aryloxy (such as phenoxy), carboxyl, oxo, cyano, nitro, carbamoyl, and alkyl.

"Amino" denotes primary (i.e., —$NH_2$), secondary (i.e., —NHR) and tertiary (i.e., —NRR) amine groups, where the R groups can be a variety of independently selected moieties, usually an alkyl or an aryl. Particular primary, secondary and tertiary amines are alkylamine groups, dialkylamine groups, arylamine groups, diarylamine groups, aralkylamine groups and diaralkylamine groups.

Suitable primary, secondary and polyamines amines for use as the amine reactant include, but are not limited to, methylamine, ethylamine, propylamine, isopropylamine, ethyl propylamine benzylamine dimethylamine, diethylamine, dipropylamine, caprylamine, palmitylamine, dodecylamine, heptylamine, stearylamine, ethylene diamine, diethylene triamine, triethylene tetraamine, tetraethylene pentamine, cadaverine, putrescine, spermine, spermidine, histamine, piperidine, ethanolamine, diethanolamine, aminoethylpiperazine, piperazine, morpholine, aniline, 1-naphthylamine, 2-napthylamine, para-aminophenol, diaminopropane, diaminodiphenylmethane, allylamine, cysteamine, aminoethylethanol amine, isopropanolamine, toluidine, Jeffamines, aminophenol, guanidine, aminothiourea, diaminoisophorone, diaminocyclohexane, dicyandiamide, amylamine, hexamethylenediamine, bis-hexamethylenediamine, polyvinylamine, polyallylamine, cyclohexylamine, xylylenediamine disopropylamine, aminoethylaminopropyltrimethoxysilane, aminopropyltriethoxysilane, aminoethylaminopropyltrimethoxysilane, aminoethylaminopropyltrimethoxysilane, aminoethylaminopropylsilane triol homopolymer, vinylbenzylaminoethylaminopropyltrimethoxysilane, aminopyridine, aminosalicylic acid, aminophenol, aminothiophenol, aminoresorcinol, bis(2-chloroethyl)amine, aminopropanediol, aminopiperidine, aminopropylphosphonic acid, amino(ethylsulfonyl)phenol, aminoethylmorpholine, aminoethylthiadiazole, aminoethyl hydrogen sulfate, aminopropylimidazole, aminoethylacrylate, polymerized aminoethylacrylate, aminoethylmethacrylate, polymerized aminoethylmethacrylate, the condensation polymers and oligomers of diacids and polyacids with triamines and higher polyamines like diethylene triamine and triethylene tetraamine.

Still other amine reactants include furfurylamine, dipropylene triamine (available from Air Products), tripropylene tetramine (available from Air Products), tetrapropylene pentamine (available from Air Products), the reaction products of amines with formaldehyde including hexamethylene tetraamine, N,N,N-tri(hydroxyethyl)triazine, triazone, low molecular weight amino esters like aminoethylacetate, aminopropylacetate, aminoethylformate, aminopropylformate, aminoethylproprionate, aminopropylproprionate, aminoethylbutyrate, aminopropylbutyrate, aminoethylmaleate, di(aminoethylmaleate), fatty aminoesters like aminoethyltallate, the aminopropyl ester of all fatty acids, fatty acid dimers, oxidized fatty acids, maleated fatty acid, and oxidized-maleated fatty acids, and the aminoethyl ester of all fatty acids, fatty acid dimers, oxidized fatty acids, maleated fatty acid, and oxidized-maleated fatty acids—particularly when the fatty acid is tall oil fatty acid (TOFA). Polyamino esters like the polymer of aminoethylacrylate, the polymer of aminoethylmethacrylate, the polymer of aminopropylacrylate, the polymer of aminopropylmethacrylate, and all other polycarboxylic acids that have been exhaustively esterfied with ethanolamine (done under acid conditions to selectively form the ester over the amide.)

Also contemplated as amine reactants for the Maillard reaction are amido amine reactions products having residual reactive amino groups of a diamine or polyamine with a carboxylic acid or a mixture of carboxylic acids such as rosin acid, maleated rosin, maleated unsaturated fatty acids, oxidized unsaturated fatty acids, oxidized maleated unsaturated fatty acids, unsaturated fatty acid dimers and trimers, particularly when the fatty acid is TOFA.

Suitable amine reactants for use in producing a Maillard reaction product by a Maillard reaction in accordance with the present invention also include both natural and synthetic amino acids, i.e., compounds having both reactive amino and acid (carboxyl) functional groups.

Suitable amino acids thus would include biogenic amino acids such as alanine, aminobutyric acid, arginine, asparagine, aspartic acid, cysteine, cystine, dibromotyrosine, diiodotyrosine, glutamic acid, glutamine, histidine, homocysteine, hydroxylysine, hydroxyproline, isoleucine, leucine, lysine, methionine, ornithine, phenylalanine, proline, sarcosine, serine, threonine, thyroxine, tryptophane, tyrosine, and valine, and all potential dimers, oligimers and polymers made from such amino acids. Synthetic amino acids including aminobenzoic acid, aminosalicylic acid, aminoundecanoic acid and all potential dimers, oligomers and polymers made from them are likewise suitable raw materials (amine reactants) for producing a Maillard reaction product by the Maillard reaction. Higher molecular weight amine reactants include peptides and proteins including gluten, whey, glutathione, hemoglobin, soy protein, collagen, pepsin, keratin, and casein as these materials can also participate in the Maillard reaction.

Other suitable synthetic amino acid-type amine reactants can be formed by reacting a polyamine with a polycarboxylic acid or a mixture of polycarboxylic acids. The reaction between the polyamine and the acid can be performed prior to, or coincident with the Maillard reaction.

Suitable polycarboxylic acids for forming a synthetic amino acid-type amine reactant by reaction with a polyamine include, but are not limited to monomeric polycarboxylic acids and/or a polymeric polycarboxylic acids. Such polycarboxylic acids include dicarboxylic acids, tricarboxylic acids, tetracarboxylic acids, pentacarboxylic acids, and higher carboxyl functionality. Certain polycarboxylic acids also may be used in their anhydride form.

To illustrate, but not to limit the potential monomeric polycarboxylic acids that can be used, mention can be made of the following: unsaturated aliphatic acids, saturated aliphatic acids, aromatic acids, unsaturated carbocyclic acids, and saturated carbocyclic acids, all of which might be optionally substituted, with hydroxy, halo, alkyl, and alkoxy groups. Representative monomeric polycarboxylic acids thus include, but should not be limited to citric acid, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, adducts of olefins and maleic acids, ethylenediamine tetraacetic acid (EDTA), maleated rosin, maleated, unsaturated fatty acids including maleated tall oil fatty acid, oxdized unsaturated fatty acids including oxidized tall oil fatty acid, oxidized maleated unsaturated fatty acids including oxidized and maleated tall oil fatty acid, unsaturated fatty acid dimer and trimers (including TOFA dimers and trimers), fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, polyacrylic acid, polymethacrylic acid, polyaspartic acid, aspartic acid, ascorbic acid, glucaric acid, styrene maleic acid copolymers, styrene fumaric acid copolymers, polyitaconic acid, adipic acid, glutamic acid, malonic acid, malic acid, polycrotonic acid, humic acid, sorbic acid, and trimesic acid.

Possible polymeric polycarboxylic acids can be equally expansive and can include homopolymers and/or copolymers prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid and $\alpha,\beta$-methyleneglutaric acid. Suitable polymeric polycarboxylic acids also may be prepared from unsaturated anhydrides including, but not necessarily limited to, maleic anhydride, itaconic anhydride, acrylic anhydride, and methacrylic anhydride. Non-carboxylic vinyl monomers, such as styrene, $\alpha$-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether and vinyl acetate, also may be copolymerized with above-noted carboxylic acid monomers to form suitable polymeric polycarboxylic acids. Methods for polymerizing these monomers are well-known in the chemical art.

Suitable polymeric polycarboxylic acids also can include certain polyester adducts of a polycarboxylic acid, such as those mentioned above, and a polyol. Suitable polyols can include, but are not limited, for example, to ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, bis-[N,N-di($\beta$-hydroxyethyl)]adipamide, bis[N,N-di($\beta$-hydroxypropyl)]azelamide, bis[N,N-di($\beta$-hydroxypropyl)]adipamide, bis[N,N-di($\beta$-hydroxypropyl)]glutaramide, bis[N,N-di($\beta$-hydroxypropyl)]succinamide, bis[N-methyl-N-($\beta$-hydroxyethyl)]oxamide, polyvinyl alcohol, a partially hydrolyzed polyvinyl acetate, and homopolymers or copolymers of hydroxyethyl(meth)acrylate, and hydroxypropyl (meth)acrylate. The polyester adduct must contain at least two carboxylic acid groups or anhydride or salt equivalents thereof. Methods for making such polyesters are well-known Another category of suitable amine reactants are the adducts of ammonia (typically supplied as an aqueous solution), primary amines, and/or secondary amines pre-reacted (or reacted in situ) with monomeric polycarboxylic acids and/or polymeric polycarboxylic acids to produce the respective ammonium salts of the acid or mixture of acids. While ammonia can conveniently be used, any reactive amine, including any primary or secondary amine suitable for reacting with monomeric polycarboxylic acid and/or a polymeric polycarboxylic acid also could be used.

Thus, ammonium salts produced by neutralizing polycarboxylic acid(s)s with ammonia, or with a primary or secondary amine including those ammonium salts produced by a less-than-complete neutralization are considered suitable for use as an amine reactant for making a Maillard reaction product to be used in carrying out a process in accordance with the present invention. In such instances, the neutralization of the acid groups of the polycarboxylic acid(s) also can be carried out either before or after the reducing sugar, or equivalent thereof is added for forming the Maillard reaction product.

The reducing sugar or equivalent thereof for forming the Maillard reaction product include carbohydrates having, or capable of generating a reducing sugar during the formation of the Maillard reaction product. A reducing sugar is a carbohydrate that either contains an aldehyde group, or can isomerize, i.e., tautomerize, to contain an aldehyde group, which is reactive with an amine e.g. a compound having an amino group under Maillard reaction conditions. Generally, such aldehyde groups can be oxidized with $Cu^{+2}$ to afford carboxylic acids. Suitable reducing sugars or their equivalents may optionally be substituted with hydroxy, halo, alkyl, and alkoxy groups. It is common for such compounds to have one or more chiral centers, and in those circumstances any of the optical isomers can be used, including racemic mixtures, or other diastereomeric mixtures of the various optical isomers. Suitable reducing sugars or their equivalents thus include monosaccharides in the aldose or ketose form, including a triose, a tetrose, a pentose, a hexose, or a heptose such as glyceraldehyde, dihydroxyacetone, erythrose, threose, erythrulose, ribose, arabinose, xylose, lyxose; ribulose, arabulose, xylulose, lyxulose, glucose (i.e., dextrose), mannose, galactose, allose, altrose, talose, gulose, idose; fructose, psicose, dendroketose, aldotetrose, aldopentose, aldohexose, sorbose, tagatose and sedoheptulose; a polysaccharide such as sucrose, lactose, maltose, starch, and cellulose, or a combination thereof.

In particular, suitable reducing sugars or reducing sugar equivalents for use in a Maillard reaction for making a Maillard reaction product include dextrose, fructose, high fructose corn syrup, dihydroxyacetone, erythrulose, ribulose, xylulose, psicose, sorbose, tagatose, glyceraldehyde, erythrose, threose, ribose, arabinose, xylose, allose, altrose, mannose, gulose, galactose, talose, maltose, cellobiose, lactose, and gentiobiose. Other reducing sugar equivalents like furfural, pyruvaldehyde, acetaldehyde, crotonaldehyde, 2-furaldehyde, quinine ascorbic acid, glycolaldehyde, glycolaldehyde dimer, trans-3-(2-furyl)acrolein, acrolein, 2,5-di(hydroxymethyl)furan, furfurol, 5-hydroxymethylfurfural, 5-methylfurfurol, 5-methylfurfural, 4-hydroxycrotonaldehyde, cinnamaldehyde and combinations thereof are also suitable as raw materials for the Maillard reaction.

The current thinking is that molecules produced by a Maillard reaction likely include a general structure comprising a backbone of carbon atoms with an occasional nitrogen atom, possibly long stretches of conjugated double bonds, and possibly highly hydrophilic side chains due to hydroxy groups being substituted on many of the carbon atoms (See "Isolation and Identification of Nonvolatile. Water Soluble Maillard Reaction Products," Thesis, Eva Kaminski, McGill University 1997). At least some nitrogen atoms are thought to be double bonded to one carbon in the backbone and the existence of carbon side chains substituted on some of the nitrogen atoms makes some of the nitrogen atoms quaternary, thus often introducing some cationic character to the molecules.

Melanoidins typically display an atomic C:N ratio, degree of unsaturation, and chemical aromaticity that increase with temperature and time of heating. (See, Ames, J. M. in "The Maillard Browning Reaction—an update," Chemistry and Industry (Great Britain), 1988, 7, 558-561, the disclosure of which is hereby incorporated herein by reference). Accordingly, Maillard reaction products used in connection with the various applications contemplated by the present invention, including certain separation processes, may contain melanoidins, or other Maillard reaction products consistent with these understandings.

The present invention also contemplates the addition of a non-carbohydrate polyhydroxy reactant along with the reducing sugar or equivalent when preparing the Maillard reaction product. Non-limiting examples of non-carbohydrate polyhydroxy reactants for optional use in combination with the reducing sugar or equivalent for making the Maillard reaction product are trimethylolpropane, glycerol, pentaerythritol, partially hydrolyzed polyvinyl acetate, fully hydrolyzed polyvinyl acetate (i.e., polyvinyl alcohol), and mixtures thereof.

The preparation of suitable Maillard reaction products is easily accomplished by mixing (1) an amine reactant and (2) a reducing sugar or a reducing sugar equivalent, or a mixture thereof under conditions conducive for a Maillard reaction. The reaction can be conducted in an aqueous medium and generally proceeds under a range of pH conditions, though an acidic pH is most commonly employed. Depending on the specific reactants chosen, the reaction may proceed under ambient conditions, or may require mild heating to initiate the reaction. Conducting the reaction in an aqueous medium under refluxing conditions has proven to be suitable. Generally, the reaction is sufficiently exothermic that once initiated, it may not be necessary to supply any additional heating such that the reaction system becomes self-refluxing.

While the relative quantities of (1) an amine reactant and (2) a reducing sugar or a reducing sugar equivalent, or a mixture thereof for preparing the Maillard reaction product can be varied depending on particular circumstances, for the most part preparing the Maillard reaction product at a relative ratio of the moles of the reducing sugar (or reducing sugar equivalent) to moles of amine functional groups (reactive amino groups) in the amine reactant within the range of 1:1 to 3:1 should be suitable.

Thus, in one embodiment, the reactant mixture for preparing a Maillard reaction product may comprise an aqueous mixture of an amine reactant, such as ammonia, a polycarboxylic acid, i.e., citric acid, and a reducing sugar, i.e., dextrose provided in a molar ratio of moles ammonia:moles citric acid:moles dextrose of 3.3:1:6. In this case, a slight excess amount of ammonia (about 10%) designed to completely neutralize the citric acid is provided. Nonetheless, the volatility of the ammonia may prevent full or complete neutralization of the citric acid during the formation of the Maillard reaction product.

When producing a Maillard reaction product for certain applications, such as for use in a separation process, it is may be useful to control the extent of the reaction that occurs. On the one hand, a simple physical mixture (e.g., an aqueous solution) of the amine reactant and the reducing sugar or equivalent may not be an effective adjuvant, e.g. a depressant or a collector. On the other hand, if the reaction leading to the Maillard reaction product is allowed to go to dryness, a highly water insoluble, hard, thermoset material may be formed in some instances. Even if the resulting solid is comminuted into small particles in such cases, the material may not be an effective adjuvant. Thus, in some cases the reaction might need to be controlled to reach a point where the solution or mixture of the reactants and/or products becomes viscous but still retains some water solubility, miscibility and/or remains dispersible in water. The ability of the Maillard reaction product to function as an adjuvant in a separation process thus may vary as a function of its molecular weight.

The exact desired end point of the reaction forming the Maillard reaction product will vary depending on its intended end use and is influenced by a variety of factors, such as the particular reactants chosen, the reactant concentrations, the reaction temperature, pH, time, etc. A skilled worker, armed with the disclosure of this application, through the exercise of only routine testing will be able to identify a suitable set of conditions for producing a suitable Maillard reaction product to be used as an adjuvant for a particular application, including a specific separation process. Applicants have observed that in the case of a Maillard reaction product made from aqueous ammonia, citric acid and dextrose, heating the aqueous mixture to atmospheric reflux, removing the heat and then allowing it to cool to room (ambient) temperature has resulted in a suitable product for use as a depressant. The resulting Maillard reaction product can be used as an aqueous solution or dispersion and some forms can be dried (e.g. such as by spray drying) to form a solid product.

The pH of the Maillard reaction product in an aqueous medium may vary from acidic, i.e., a pH less than 7, for example between 2 and 6, to an alkaline pH, i.e., a pH greater than 7, for example between 8 and 12, depending on the specific types and amounts of the various reactants. The present invention contemplates neutralizing, i.e., forming a salt of such acidic and alkaline Maillard reaction products using an appropriate base or acid depending on the pH of the reaction product. Such neutralized products also are contemplated for use as an adjuvant in a separation process in accordance with the present invention. Thus, in the case of an acidic reaction product, a base, such as an alkali or alkaline earth metal hydroxide, (e.g., sodium or potassium hydroxide), an amine (e.g., a primary, secondary or tertiary amine such as guanidine), ammonia or some other organic or inorganic base, may be added to the Maillard reaction product. Alternatively, in the case of a alkaline reaction product, an acid, such as an inorganic acid (e.g., hydrochloric acid or sulfuric acid) or an organic acid (e.g., acetic acid or formic acid), may be added to the Maillard reaction product to form the neutralized salt.

In one embodiment, the present invention is directed to use of the above-described Maillard reaction products as adjuvants for removing, generally in a selective fashion, a wide variety of solids and/or ionic species from liquids, usually water, in which they are suspended and/or dissolved. These Maillard reaction products, depending on their specific structure, are especially useful either as flotation depressants or collectors in the beneficiation of many types of materials including minerals and metal ores, in the flotation of dispersed ink particles to de-ink printed paper pulp, in the beneficiation of kaolin clay and in the recovery of bitumen from sand and/or clay contaminants to name but a few flotation applications. Indeed, combinations of such materials can be used in a single separation system or process, the distinct materials functioning separately as depressants and as collections depending on their specific structure.

For use as an adjuvant in such separation processes, including the processes identified hereinafter, it is contemplated that an effective amount of the Maillard reaction product will usually be between about 0.0001 to 0.1 part by weight of the Maillard reaction product per part by weight of the total solids material in the solution, slurry, suspension or dispersion being treated (e.g., a clay-containing ore slurry). It is anticipated that in most cases an effective amount of the Maillard reaction product will usually be between about 0.0005 to 0.05 part by weight of the Maillard reaction product per part by weight of the total solids material in the solution, slurry, suspension or dispersion being treated. In any event, an effective, and particularly an optimal addition amount of the Maillard reaction product for any particular solids separation process can be readily ascertained by those of skill in the art using only routine experimentation.

In another embodiment, the Maillard reaction products of the present invention are also useful as an adjuvant for treating aqueous liquid suspensions (e.g., aqueous suspensions containing sand, clay, coal, and/or other solids, such as used drill cutting fluids, as well as process and effluent streams in phosphate and coal production, in sewage treatment, in paper manufacturing (e.g., in a de-inking process), or in bitumen recovery facilities) to facilitate the removal (such as by, but not limited to sedimentation, filtration or flotation) of dispersed particles such as solid particulates and also potentially metallic cations (e.g., in the purification of drinking water) using a number of possible separation processes. The Maillard reaction products depending on their specific structures, as described herein, are expected to have selectivity for a variety of dispersed materials, often considered as contaminants, and especially siliceous materials such as sand or clay.

In one separation process, a Maillard reaction product is used as a depressing agent in a method for beneficiation of an ore by flotation. The method comprises treating an aqueous slurry of ore particles with an amount of the Maillard reaction product effective to depress an impuritiy selected from, but not limited to, sand, clay, an iron oxide, a titanium oxide, iron-bearing titania, mica, ilmenite, tourmaline, an aluminum silicate, calcite, dolomite, anhydrite, ferromagnesian, feldspar, calcium magnesium carbonate, igneous rock, soil, and mixtures thereof from the valued material in the slurry. The valued material could include, but is not limited to, phosphate, potash, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, and borate. The slurry is treated by simply mixing the Maillard reaction product with the slurry.

If the Maillard reaction product is prepared such that it contains a strongly cationic functionality, such as a trimethylammonium moiety, the resulting Maillard reaction product may have enhanced depressant functionality to depress silicates like clays, micas, talc, feldspar, kaolin, kyanite, muscovite, calamine, and hemimorphite. Incorporation of the cationic functionality can be achieved by incorporating choline, betaine, carnitine, lecithin, imidazolines or their blends as an amine reactant into the Maillard reaction product synthesis. An alternative method to incorporate strongly cationic functionality into the Maillard reaction product is to post-treat a highly amine functional Maillard reaction product, such as one made with polyamines, with a strong alkylating agent like methyl bromide, methyl iodide, dimethylsulfate and diethylsulfate.

In another embodiment, the Maillard reaction product can be modified to contain sulfur functionality. A sulfur-modified Maillard reaction product would have use as a depressant for a valued ore in a reverse flotation process where the gangue or some other ore is floated. Incorporation of sulfur functionality in a Maillard reaction product can be achieved by a variety of methods including post-reacting an amine functional Maillard reaction product with carbon disulfide to add thionocarbamate functionality. Alternatively, the synthesis of the Maillard reaction product could be conducted in the presence of carbon disulfide, thioglycolic acid, cysteamine, cysteine, cystine, thioctic acid, methionine thiourea, or their blends. Another alternative means of adding sulfur functionality to a Maillard reaction product is simply to include carbon disulfide in the front end of the Maillard reaction product synthesis to create xanthate functionality. The resulting sulfur functional Maillard reaction product then can be used as a depressant in the reverse flotation of the sulfide mineral ores of iron, silver, copper, zinc, lead, molybdenum, antimony, bismuth, gold, arsenic, cobalt, nickel and the platinum group metals.

For other applications, it may be desirable to incorporate phosphorus functionality selected from phosphate, phosphonate or phosphate ester functionality into the Maillard reaction product. A Maillard reaction product with phosphate, phosphonate or phosphate ester functionality would be expected to depress minerals with an affinity for these moieties in a flotation separation process. The resulting product can be used as a depressant for iron and titanium containing heavy minerals, biotite, calcite, dolomite, and magnesite. Incorporation of the phosphate, phosphonate or phosphate ester functionality can be achieved, for example, by incorporating aminotrimethylene phosphonate, phosphorus trichloride, phosphorus pentachloride, phosphonobutane tricarboxylic acid, phosphorus oxychloride, phosphorus pentoxide, or their blends into the Maillard reaction product synthesis. An alternative method to incorporate phosphate, phosphonate or phosphate ester functionality into the Maillard reaction product is to post-treat one type of Maillard reaction product with phosphorus trichloride, phosphorus pentachloride, phosphonobutane tricarboxylic acid, phosphorus oxychloride, phosphorus pentoxide. Such Maillard reaction products would also be expected to have corrosion inhibition activity, especially if the Maillard reaction product is one made using a fatty amine-type amine reactant as discussed hereafter.

For still other applications, it may be desirable to incorporate sulfonate or sulfate functionality into a Maillard reaction product. A Maillard reaction product with sulfonate or sulfate functionality would be expected to depress minerals with an affinity for these moieties in a flotation separation process. Such functionality is best achieved by the post treatment of a Maillard reaction product with a sulfite salt, a bisulfite salt, or fuming sulfuric acid. Alternatively, sulfated or sulfonated reagents such as aminomethyl sulfonate, aminoethyl hydrogen sulfate, napthylamine sulfonic acid, sulfanilic acid, aminoethyl hydrogen sulfate, napthylamine sulfonic acid, sulfamic acid, sulfophthalic acid, sulfoacetic acid, sulfobenzoic acid, sulfosalicylic acid, sulfosuccinic acid, diaminobenzene sulfonic acid, taurine or any blend of those materials could be incorporated into the synthesis of the Maillard reaction product. Alternately, the Maillard reaction product could be post-treated with sulfuric acid to add sulfate functionality to form such sulfonate or sulfate modified Maillard reaction products. Such Maillard reaction products would also be expected to have corrosion inhibition activity, especially if the Maillard reaction product is one made using a fatty amine-type amine reactant as discussed hereafter.

In another embodiment, the Maillard reaction product can be optimized for use as a flotation collector, such as in the reverse flotation of iron, pyrochlore, and phosphate and in the direct flotation of clays, micas, talc, feldspar, kaolin, kyanite, potash, muscovite, calamine, smithsonite, and hemimorphite. In this case, the amine reactant would be selected to provide sufficient hydrophobicity for a particular application. For example, the Maillard reaction product would be made from a fatty amine reactant, e.g., a primary amine ($NH_2R^1$) or a secondary amine ($NHR^1R^2$), where at least one of the $R^1$ and $R^2$ substituents includes an alkyl chain of at least seven carbon atoms, such as caprylamine, palmitylamine, dodecylamine, heptylamine, stearylamine, dodecylaniline, and 11-amino-undecanoic acid, and also including an amidoamine reaction product of a diamine or polyamine with rosin acid, maleated rosin, maleated unsaturated fatty acids, oxdized unsaturated fatty acids, oxidized maleated unsaturated fatty acids, unsaturated fatty acid dimers and trimers, particularly where the fatty acid is TOFA. Producing a Maillard reaction product in this manner facilitates its use as a flotation collector as the core structure provides a moiety that binds to a valued mineral and thus connects that mineral to air bubbles through the fatty tail of the Maillard reaction product, thus allowing the mineral to float. In using these particular Maillard reaction product collectors, best results will likely be obtained when the ratio of amine to other functionality is relatively high and the pH of the flotation medium is adjusted down with any number of mineral or organic acids like acetic acid, formic acid, hydrochloric acid, sulfuric acid, and/or phosphoric acid, among others, to protonate any active amines.

By using acid functional fatty raw materials, like adducts of olefins and maleic acids, maleated unsaturated fatty acids, oxidized unsaturated fatty acids, oxidized maleated unsaturated fatty acids, unsaturated fatty acid dimer and trimers and particularly TOFA based materials, certain ores can be floated including apatite and other phosphate ores, feldspar, gypsum, barite, lead oxide ores, lime, celestite, fluorspar, kainite, anglesite, anhydrite, fluorite, potash, magnesite, scheelite, alunite, bauxite, gypsum, biotite, dolomite, albite, orthoclase, microcline, columbite, tantalite, pyrochlore, cassiterite, wolframite, rutile, ilmenite, hematite, kaolin, and calcite.

Likewise, if both sulfur and fatty functionality is incorporated into the Maillard reaction product, the resulting product can be used as a collector in the flotation of the sulfide mineral ores of iron, silver, copper, zinc, lead, molybdenum, antimony, bismuth, gold, arsenic, cobalt, nickel and the platinum group metals. As noted above, fatty functionality can be introduced by using fatty amine reactants of by using fatty acid-type materials to modify the amine reactant. Incorporation of sulfur functionality is achieved by several methods including post-reacting fatty amine functional Maillard reaction products with carbon disulfide to add thionocarbamate functionality, incorporating carbon disulfide, thioglycolic acid, cysteamine, cysteine, cystine, thioctic acid, methionine thiourea, or their blends into the Maillard reaction product synthesis. An alternative means of adding sulfur functionality is to simply include carbon disulfide in the front end of the Maillard reaction product synthesis to create xanthate functionality.

Alternatively, strongly cationic functionality such as a trimethylammonium moiety is incorporated into the Maillard reaction product also containing fatty functionality (as described above), the resulting product can be used as a collector in the direct flotation of silicates like clays, micas, talc, feldspar, kaolin, kyanite, muscovite, calamine, and hemimorphite. As note above, cationic functionality can be introduced by incorporating choline, betaine, carnitine, lecithin or their blends into the Maillard reaction product synthesis. An alternative method to incorporate strongly cationic functionality is to post-treat a highly amine functional Maillard reaction product with a strong alkylating agent like methyl bromide, methyl iodide, dimethylsulfate and diethylsulfate. Yet another alternative method to incorporate strongly cationic functionality is to convert amido amine functionality to imidazoline functionality either in a preceding or in a post Maillard reaction step.

Likewise if dithiophosphate and fatty functionality is incorporated into the Maillard reaction product, the resulting product can be used as a collector in the flotation of the sulfide mineral ores of iron, silver, copper, zinc, lead, molybdenum, antimony, bismuth, gold, arsenic, cobalt, nickel and the platinum group metals. Such a collector can also be used in the flotation of diamonds. Incorporation of such functionality may be achieved by incorporating phosphorus pentasulfide into the Maillard reaction product synthesis. Dithiophosphate collectors are often used in combination with collectors containing sulfur functionality. Such Maillard reaction products would also be expected to have corrosion inhibition activity.

In another embodiment, a collector for the direct flotation of iron and titanium containing heavy minerals, biotite, calcite, dolomite, magnesite, and fluorspar can be prepared by incorporating phosphate, phosphonate or phosphate ester functionality into a Maillard reaction product containing fatty functionality. The phosphate functional fatty Maillard reaction product collector may be used in combination with other collectors like amine functional or carboxylic acid functional collectors. Incorporation of the phosphate, phosphonate or phosphate ester functionality is achieved by incorporating aminotrimethylene phosphonate, phosphorus trichloride, phosphorus pentachloride, phosphonobutane tricarboxylic acid, phosphorus oxychloride, phosphorus pentoxide, lecithin or their blends into the Maillard reaction product synthesis. An alternative method to incorporate phosphate, phosphonate or phosphate ester functionality is to post-treat a highly amine functional Maillard reaction product with phosphorus trichloride, phosphorus pentachloride, phosphonobutane tricarboxylic acid, phosphorus oxychloride, or phosphorus pentoxide. Such Maillard reaction products would also be expected to have corrosion inhibition activity.

In another embodiment, sulfonate or sulfate functionality into a fatty Maillard reaction product used as a collector. Such functionality is best achieved by the post addition of a fatty Maillard reaction product with a sulfite salt, a bisulfite salt, or fuming sulfuric acid. Alternatively, sulfated or sulfonated reagents such as sulfanilic acid, sulfamic acid, sulfophthalic acid, sulfoacetic acid, sulfobenzoic acid, sulfosalicylic acid, sulfosuccinic acid, diaminobenzene sulfonic acid, taurine, aminomethyl sulfonate, aminoethyl hydrogen sulfate, napthylamine sulfonic acid, or any blend of those materials could be incorporated into the synthesis of the Maillard reaction product. Sulfated unsaturated and/or hydroxy functional fatty acids such as ricinoleic acid can be used as starting materials to make sulfated Maillard reaction products. These sulfated fatty acids are made by treating unsaturated and/or hydroxy functional fatty acids with sulfuric acid. These sulfated fatty acids can be oxidized and/or maleated prior to incorporation in the Maillard reaction. Alternately, the Maillard reaction product can be post-treated with sulfuric acid to add sulfate functionality. The resulting sulfonated or sulfated Maillard reaction product would be particularly useful as a collector for biotite, calcite, dolomite, magnesite, iron oxides, rutile, celestite, gypsum, kainite, anglesite, bauxite, barite, alunite, fluorspar, anhydrite, and ilmenite. Such Maillard reaction products would also be expected to have corrosion inhibition activity.

In another embodiment, a Maillard reaction product modified to include hydroxamic acid functionality may be used as a collector. Such functionality is can be achieved by condensing of some or all of the fatty acid-type raw materials destined for use the synthesis of the Maillard reaction product with hydroxylamine prior to the synthesis of the Maillard reaction product. Alternatively, hydroxyl amine can be condensed with the Maillard reaction product made with fatty acid-type materials, either in a post reaction or the hydroxyl amine may be included as a raw material during the synthesis of the Maillard reaction product. Fatty Maillard reaction products containing hydroxamate functionality can be used in the flotation of oxide, hydroxide, and phosphate minerals like Aeschynite, Anatase, Bindheimite, Bixbyite, Brookite, Chrysoberyl, Columbite, Corundum, Cuprite, Euxenite, Fergusonite, Hausmannite, Hematite, Ilmenite, Perovskite, Periclase, Polycrase, Pseudobrookite, Pyrochlore, Betafite, Microlite, Ramsdellite, Romanechite, Cassiterite, Plattnerite, Pyrolusite, Rutile, Stishovite, Samarskite, Senarmontite, Chromite, Franklinite, Gahnite, Magnesiochromite, Magnetite, Spinel, Taaffeite, Tantalite, Tapiolite, Uraninite, Valentinite, Zincite, Brucite, Gibbsite, Goethite, Limonite, Manganite, Psilomelane, Romeite, Stetefeldtite, Carnotite, tyuyamunite, Meta-autunite, autunite, apatite, phosphuranylite, tobernite, rhabdophane, triphylite, woodhouseite, Brazilianite, chirchite, lithiophilite, Hinsdalite, svanbergite, arthurite, cacoxenite, tsumebite, Variscite, hopeite, meta-ankoleite, scholzite, strengite, whitlockite, xenotime, amblygonite, kidwellite, laueite, meta-uranocircite, metavariscite, montebrasite, pseudomalachite, rockbridgeite, strunzite, tarbuttite, whiteite, anapaite, augelite, beraunite, chalcosiderite, collinsite, uranocircite, zeunerite, boltwoodite, uranophane, meta-torbernite, meta-uranocircite, walpurgite, zippeite, uranopilite, coconinoite, monazite, Stibiconite, quetzalcoaltlite, zincite, Hodgkinsonite, aurichalcite, hydrozincite, rosasite, descloizite, Hopeite, veszelyite, ktenasite, and gahnite.

By maximizing the level of fatty carbon and minimizing the mole ratio of polar groups to alkyl groups, a Maillard reaction product can be synthesized that would be an excellent collector for minerals that are currently treated with fuel oil or diesel fuel, such as coal, oil sands, heavy crude oil, sulfur, feldspar and phosphate ores like apatite. This result can be achieved by incorporating alkylphenol formaldehyde condensates and alkoxylated alkylphenol formaldehyde condensates into the synthesis of the Maillard reaction product or alternatively, by blending such condensates with the Maillard reaction product. Another alternative is to simply adjust the mole ratio of fatty acids or fatty acid derivatives to the more polar raw materials such as the reducing sugar. Incorporation of other reactive but relatively non-polar raw materials like benzaldehyde, aniline, the mono-condensation products of fatty alcohols and fatty amines with maleic anhydride, phthalic anhydride, tetrahydrophthalic anhydride, or trimellitic anhydride, benzylamine, naphthylamine, alkyl and alkenyl succinic acids, natural oils including vegetable oils, benzoic acid, and alkyl benzoic acids also provides a suitable approach. Activity can be increased and cost decreased by post blending such Maillard reaction products of sufficient hydrophobicity with fuel oil, diesel, or other nonpolar solvents and additives.

In another embodiment, the Maillard reaction product can be modified to contain silane functionality. A silane-modified Maillard reaction product would have use as a flotation depressant for silicates. Incorporation of silane functionality in a Maillard reaction product can be achieved by a variety of methods including post-reacting a Maillard reaction product with a chloro silane, for example such as dimethyldichlorosilane, diphenyldichlorosilane, methylphenyldichlorosilane, methyldichlorosilane, methyltrichlorosilane, ethyltrichlorosilane, phenyltrichlorosilane, trichlorosilane, trimethylchlorosilane, vinyltrichlorosilane, or silicon tetrachloride. Silane modification could also be achieved by post-treating a Maillard reaction product with an epoxy functional silane such as glycidoxypropyltrimethoxysilane or glycidoxypropylmethyldiethoxysilane. Alternatively, an amine functional silane like aminoethylaminopropyltrimethoxysilane, aminopropyltriethoxysilane, aminoethylaminopropyltrimethoxysilane, aminoethylaminopropyltrimethoxysilane, aminoethylaminopropylsilane triol homopolymer, and vinylbenzylaminoethylaminopropyltrimethoxysilane could be incorporated into the synthesis of the Maillard reaction product as part or all of the reactive amine component. Additionally, an epoxy silane like glycidoxypropyltrimethoxysilane or glycidoxypropylmethyldiethoxysilane could be incorporated into the front end of the Maillard reaction product synthesis. If mercapto silane functionality is desired then a silane like mercaptopropyltrimethoxysilane could be incorporated into the Maillard synthesis.

Silane modified Maillard reaction product useful as collectors for silicates may also be obtained by using all the same silane incorporation techniques used to makes silicate depressants but incorporating a fatty amine or fatty acid functional ingredient as describe above would be used in the Maillard reaction product synthesis.

Aza-crown ethers and mixed heteroatom crown ethers are often used to form very specific metal ion chelates. This highly selective chelating ability, if incorporated into a Maillard reaction product, may enhance the utility of the resulting material as a flotation collector or depressant, depending on whether fatty functionality is also incorporated into the ultimate product. In yet another embodiment, the Maillard reaction product can be modified to contain aza crown ether functionality. Flotation collectors and depressants incorporating aza crown functionality can be made using the aza crown as all or part of the reactive amine in a Maillard reaction product synthesis. Whether the resulting Maillard reaction product would be used as a collector, or instead used as a depressant would depend on whether fatty alkyl chains are incorporated into the Maillard reaction product or not. Suitable aza-crown ethers to use in this application include 1,4,8,11-tetraazacyclotetradecane; 1,5,9-triazacyclododecane; 1,4,7-triazacyclononane; 1,4,7-triazacyclononane tri HCl; 1-Aza-18-crown-6; 1-Aza-15-crown-5; 1,10-diaza-18-crown-6; 1,4,8,11-tetraazacyclotetradecane-5,7-dione and their blends. Likewise porphyrins made be added in the same way to incorporate macrocyclic chelating functionality in the Maillard reaction product.

Phenols and substituted phenols often form very strong complexes with certain metal ions like iron. This complex-forming capability can be incorporated into a Maillard reaction product to provide the resulting material with utility as a flotation collector or depressant, depending on whether fatty functionality is also incorporated during the synthesis. Thus, in yet another embodiment, the Maillard reaction product can be modified to contain phenolic functionality. Collectors incorporating phenolic functionality can be made by condensing a fatty acid with an aminophenolic compound like aminophenol, aminosalicyclic acid, aminothiophenol, aminoresorcinol, and amino(ethylsulfonyl)phenol and using the resulting phenolic fatty amide in the synthesis of a Maillard reaction product intended for use as a flotation collector. Likewise the aminophenolic compound can be used as part or all of the reactive amine component of a Maillard reaction product intended for use as a flotation collector or depressant, depending on whether fatty functionality is also incorporated during the synthesis.

For other applications, it may be desirable to incorporate a polysaccharide with the Maillard reaction product. A Maillard reaction product chemically modified with or possibly blended with a polysaccharide may be used as a depressant. The polysaccharide may be added at the front end of the synthesis for chemical incorporation into the Maillard reaction product, or the polysaccharide could be incorporated as a physically blended component with the Maillard reaction product. Suitable polysaccharides include, for example, starch, cationic starch, gums, dextrin and their blends.

In another embodiment, the Maillard reaction product may be used as an adjuvant in a process for purifying an aqueous liquid suspension comprising a solid contaminant. Results may be obtained by adding the Maillard reaction product in an amount between about 0.0001 to 0.1 part by weight of the Maillard reaction product per part by weight of the total solids material in the suspension. The method comprises treating (contacting) the liquid suspension with the Maillard reaction product and removing, either after or during the treating step, (1) at least a portion of the solid contaminant in a contaminant-rich fraction and/or (2) a purified liquid. The treating step may comprise flocculating the solid contaminant (e.g., sand or clay). The removing step may be accomplished by sedimentation, flotation, or filtration. Specific applications may include recovering a purified oil well drilling fluid for reuse in oil well drilling, recovering a purified water from clay slimes for reuse in a phosphate recovery operation, dewatering an aqueous coal slurry, dewatering sewage, dewatering a pulp or paper mill effluent, or recovering bitumen from sand or clay impurities.

In another embodiment, the Maillard reaction product could also be used for purifying water from metallic cation contamination. The method comprises treating (e.g., contacting) the water with a Maillard reaction product and removing at least a portion of the metallic cation by filtration to yield purified water (e.g., potable water). Removal might be assisted through the use of membrane filtration.

In still another embodiment, the Maillard reaction product could also be used for airborne dust suppression. The Maillard reaction product can be applied at a concentration of between about 0.01 to 10 percent by weight of the Maillard reaction product. In particular, a composition of a Maillard reaction product, such as an aqueous composition, would be applied onto a dust generating surface in order to reduce airborne dust formation. Such a composition could be used on roads, on open railcars and trucks carrying fugitive solids, on conveyer belts, for dirt parking lots, and other surfaces where airborne dust generation could present a problem. Maillard reaction products also could be blended or co-reacted with certain additives to improve performance in such applications or to lower the overall cost of the composition. Such additives include crude tall oil, oxidized crude tall oil, fuel oil, kerosene, heavy oils and waxes, humic acid, tannins, lignosulfonates, polysaccharides, urea formaldehyde adducts, tall oil pitch, coal tar pitch, asphalt, fatty acids, oxidized unsaturated fatty acids, oxidized maleated unsaturated fatty acids, maleated unsaturated fatty acids, fatty acid dimers, vegetable oils, animal oils and fats. It also may be desirable for such applications to incorporate strongly cationic functionality, such as a trimethylammonium moiety, into the Maillard reaction product to improve adhesion to dust-forming substrates. As noted above, incorporation of the cationic functionality can be achieved by incorporating choline, betaine, carnitine, lecithin, imidazolines or their blends into the Maillard reaction product synthesis. An alternative method to incorporate strongly cationic functionality is to post-treat a highly amine functional Maillard reaction product such as one made with polyamines with a strong alkylating agent like methyl bromide, methyl iodide, dimethylsulfate and diethylsulfate.

In still another embodiment, the Maillard reaction product could be used as a slow release fertilizer. In this application, the Maillard reaction product would be prepared using a high nitrogen containing amine reactant and/or by forming the Maillard reaction product at a high mole ratio of amine reactants with the reducing sugar or equivalent. Preferred amine reactants would include ammonia, lysine, and guanidine. Preferred reducing sugars would be those which contribute the least amount of carbon such as glyceraldehyde and dihydroxyacetone. The Maillard reaction product also could be blended or co-reacted with certain additives to provide more nutrient value like manure, urea formaldehyde adducts, urea, humic acid, ammonium nitrate, potassium phosphate, potassium nitrate, ammonium phosphate and micronutrients. Soil amendments like expanded perlite, vermiculite, potting soil, or humic acid could be co-blended with the product. Likewise pesticides, nitrification inhibitors and water retaining agents can be blended with the Maillard reaction product.

It another embodiment, the Maillard reaction products made with fatty raw materials (fatty amine reactants, including amine adducts with fatty acid materials), as described above for use as a flotation collector, could also be used as an emulsifier. In such applications, hydrophobic materials can be emulsified in a hydrophilic vehicle such as water. Alternatively, hydrophilic materials could be emulsified in a hydrophobic vehicle, such as an oil. In either case, suitable results may be obtained by adding the Maillard reaction product in an amount between about 0.0001 to 0.1 part by weight of the Maillard reaction product per part by weight of the material to be emulsified. Particular applications for using the Maillard reaction product as an emulsification adjuvant include oil drilling muds, oil sands processing, asphalt, oil pipelines, mineral slurry pipelines and other processes requiring emulsification.

As noted above, Maillard reaction products made with fatty amine reactants and/or modified with fatty acid-type materials, particularly those further modified to introduce other functional groups such as phosphate, phosphonate, phosphate esters, sulfonate, sulfate and alkynyl groups could also be used as corrosion inhibitors. This embodiment provides a process for reducing corrosion comprising contacting a material in need of corrosion protection with a Maillard reaction product. Applications amenable for such treatment include oil drilling, oil sands processing, oil refinery processing, oil pipelines, mineral slurry pipelines, chemicals plants, boilers and other processes requiring protection of metal from corrosion. Incorporation of alkynyl groups into the Maillard reaction product can be accomplished by using acetylenedicarboxylic acid as a raw material in the synthesis reaction. Alternatively acetylene diols can be condensed with unsaturated fatty acids, oxidized unsaturated fatty acids, maleated fatty acids and/or oxidized maleated fatty acids and the resulting condensation product can be incorporated into a Maillard reaction product. Maillard reaction products having alkynyl groups incorporated into the Maillard reaction product, particularly those made from fatty amine reactants, or modified with fatty acid-type materials, may also be suitable as a flotation collector for certain minerals.

In another embodiment, the Maillard reaction product can be added to a cementitious slurry in order to reduce its viscosity. Materials which when added to a cementitiuos slurry, such as a cement slurry or a gypsum slurry, to produce a higher flow at a lower water usage are known in the art alternatively as dispersing agents, superplasticizers, water reducing aids and the like. Functionally, these materials reduce the slurry's viscosity allowing it to flow more readily. The Maillard reaction products, especially the fatty Maillard reaction products described above exhibit this behavior. Thus, the present invention is also directed to a process for reducing the viscosity of a cementitious slurry comprising adding a Maillard reaction product to the slurry. Results may be obtained by adding the Maillard reaction product in an amount between about 0.0001 to 0.1 part by weight of the Maillard reaction product per part by weight of the total solids material in the slurry.

It will be understood that while the invention has been described in conjunction with specific embodiments thereof, the foregoing description and examples are intended to illustrate, but not limit the scope of the invention. Unless otherwise specifically indicated, all percentages are by weight. Throughout the specification and in the claims the term "about" is intended to encompass + or −5%.

EXAMPLES

Example 1

Preparation of a Maillard Reaction Product for Use as a Depressant

A Maillard-like reaction product was prepared according to the following procedure: 1081 grams of anhydrous dextrose, 194.5 grams of anhydrous citric acid, and 183.8 grams of 28% aqua ammonia were combined in a reaction vessel and then heated while being stirred to a target of temperature 85° C. Heating was terminated when the mixture attained 85° C., but the exothermic reaction carried the temperature further to nearly 105° C., before the reaction mixture started to cool. No vacuum was applied to the vessel during the reaction. The final mixture was a dark-brown syrup, the solids were measured to be 65% using a microwave CEM set to a maximum temperature of 135° C. The specific gravity is 1.3.

Example 2

Titration of the Maillard Produced in Example 1 Reaction Product 12.3 grams of the dark-brown syrup produced in Example 1 was diluted in 98.8 grams of water, where it exhibited a pH of 3.70. A 0.2 N NaOH solution was added to the solution with intermittent pH testing with a pH probe. 120 ml of the NaOH solution was needed to neutralize the 12.3 grams and yield a solution having a pH of 8.5. Adding above this amount of NaOH solution, the pH would be initially high, but then would fall over time to a pH of 9. To neutralize the solution of the Maillard reaction product with ammonia to the same degree as was done with 120 ml of NaOH on 12.3 g of syrup, would require about 11.85 grams of 28% aqua ammonia to 100 g of syrup.

Example 3

Neutralization of the Maillard Reaction Product With Aqua Ammonia

To 468.6 g of the Maillard reaction product of Example 1 was added 56 grams of 28% aqua ammonia. The resulting pH was 6.72. The final solids tested at 65% using a microwave CEM set to a maximum temperature of 135° C. The specific gravity is 1.3.

Example 4

Neutralization of the Maillard Reaction Product With Guanidine Carbonate 71.9 grams of guanidine carbonate was added to 410.2 grams of the Maillard reaction product of Example 1. The mixture swelled, and 200 ml of water was added in two 100 ml aliquots in order to depress the foam. The resulting mixture had a pH of 6.08 and a solids content of 53% using a microwave CEM set to a maximum temperature of 135° C. The specific gravity is 1.22.

Example 5

Preparation of a Maillard Reaction Product of Dextrose and Lysine for Use as a Depressant A Maillard reaction product was prepared according to the following procedure: 720.56 grams of anhydrous dextrose, 183.67 grams of lysine HCl, 68.3 grams of 28% aqua ammonia, and 392 grams of water were combined in a reaction vessel and then heated while being stirred to a target temperature of 85° C. Heating was terminated when the mixture attained 85° C., but the exothermic reaction carried the temperature further to nearly 105° C., before the reaction mixture started to cool. Vacuum was applied to the vessel to facilitate cooling. The final mixture was a dark-brown syrup, the solids were measured to be 62% by weight using a microwave CEM set to a maximum temperature of 135° C. The specific gravity is 1.32.

Example 6

Preparation of a Maillard Reaction Product of Dextrose and Betaine for Use as a Depressant A Maillard reaction product was prepared according to the following procedure: 1080 grams of anhydrous dextrose, 460 grams of betaine HCl, and 200 grams of 28% aqua ammonia were combined in a reaction vessel and then heated while being stirred to a target temperature of 85° C. Heating was terminated when the mixture attained 85 C, but the exothermic reaction carried the temperature further to nearly 105° C., before the reaction mixture started to cool. Vacuum was applied to the vessel to facilitate cooling. The final mixture was a dark-brown syrup, the solids were measured to be 61% by weight using a microwave CEM set to a maximum temperature of 135 C. The specific gravity is 1.23.

Example 7

Evaluation of Maillard Reaction Products from Example 4 as Clay and Sand Depressants in the Flotation of Athrabasca Oil Sands The Maillard reaction products described in Examples 1, 3 and 4 were tested as a clay and sand depressant in the flotation of Athrabasca Oil Sands using a Denver 2 L mechanical flotation machine (Denver Model D-12). Maillard Reaction Product was added to 950 ml dionized water such that dosages of 0.1, 0.25 and 0.5 lb/ton of slurry were obtained. The pH of the solutions were adjusted to 7.3 and the solutions were heated to 50° C. before adding it to the flotation cell. 450 gm of the oil sands containing 14.2% bitumen was then added to the flotation cell. The resulting slurry was conditioned with agitation (1500 rpm) for 2 min. After conditioning, the air was turned on to a flow rate of 730 ml/min. Using a spatula, the bitumen froth that was floating on the surface was scraped off into a collection vessel. The bitumen froth product was collected, weighed and assayed. The same procedure was repeated for the baseline measurement except no Maillard reaction product was added. The following equations were used to calculate the bitumen recovery, the solids recovery, and the separation efficiency:

$$RB = CB/FB \times 100\%$$

$$RS = CS/FS \times 100\%$$

$$SE = RB - RS$$

Where
RB: Bitumen Recovery,
RS: Solid Recovery,
SE: Separation Efficiency,
CB: Weight of Bitumen in Concentrate,
FB: Weight of Bitumen in Feed,
CS: Weight of Solid in Concentrate,
FS: Weight of Solid in Feed.

The following table (Table 1) details the flotation performance with and without the depressant (Rpm: 1500; 50° C., pH: 7.3; Depressant dosage: 0.1; 0.25 and 0.5 lb/ton; Condition time: 2 min).

TABLE 1

| Depressant | Dosage (lb/ton) | Bitumen Recovery (%) | Solids Recovery (%) | Separation Efficiency (%) |
|---|---|---|---|---|
| From Example 1 | 0.1 | 93.51 | 7.4 | 86.11 |
|  | 0.25 | 70.86 | 24.8 | 46.06 |
|  | 0.5 | 68.91 | 22.35 | 46.57 |
| From Example 3 | 0.1 | 79.38 | 9.01 | 70.37 |
|  | 0.25 | 70.89 | 22.78 | 48.11 |
|  | 0.5 | 68.88 | 21.44 | 47.44 |
| From Example 4 | 0.1 | 88.72 | 7.77 | 80.95 |
|  | 0.25 | 96.05 | 21.89 | 74.16 |
|  | 0.5 | 83.49 | 19.19 | 64.31 |
| Baseline, no reagent |  | 78.76 | 27.18 | 51.58 |

As shown in the table, the Maillard reaction products show improvements in bitumen recovery and separation efficiency over the baseline containing no reagent, with Example 4 showing the largest improvement.

Example 8

Evaluation of Maillard Reaction Products from Examples, 1, 3, 4, 5 and 6 as Sand Depressant in the Bitumen Flotation from Oil Sands Table 3 presents the results of separating oil sands using the Maillard reaction products described in Examples 1, 3, 4, 5 and 6 using a typical flotation cell (e.g., a Denver 2 L mechanical flotation machine (Denver Model D-12)). Oil sand and Maillard Reaction Product were added to deionized water to obtain a binder dosage of 0.1 lb/ton of solids. The pH of the solution was adjusted to 7.3 and the solution was heated to 50° C. before adding it to the flotation cell. The resulting slurry was conditioned with agitation (1500 rpm) for 2 min. After conditioning, the air was turned on to a flow rate of 730 ml/min. Using a spatula, the bitumen froth that was floating on the surface was scraped off into a collection vessel. The bitumen froth product was collected, weighed and assayed. The same procedure was repeated for the baseline measurement except no Maillard reaction product was added. The following equations were used to calculate the bitumen recovery, the solids recovery, and the separation efficiency:

$$RB = CB/FB \times 100\%$$

$$RS = CS/FS \times 100\%$$

$$SE = RB - RS$$

Where
- RB: Bitumen Recovery,
- RS: Solid Recovery,
- SE: Separation Efficiency,
- CB: Weight of Bitumen in Concentrate,
- FB: Weight of Bitumen in Feed,
- CS: Weight of Solid in Concentrate,
- FS: Weight of Solid in Feed.

The following table (Table 3) details the flotation performance.

TABLE 2

| Depressant | Dosage (lb/ton) | Bitumen Recovery (%) | Solids Recovery (%) | Separation Efficiency (%) |
|---|---|---|---|---|
| From Example 1 | 0.1 | 96.56 | 8.04 | 88.52 |
| From Example 3 | 0.1 | 93.38 | 8.33 | 85.05 |
| From Example 4 | 0.1 | 92.92 | 5.85 | 87.07 |
| From Example 5 | 0.1 | 88.06 | 7.4 | 80.67 |
| From Example 6 | 0.1 | 95.46 | 8.24 | 87.23 |
| Baseline, no reagent | | 85.29 | 9.34 | 75.95 |

As shown in the table, the Maillard reaction products of Examples 1, 3, 4, 5 and 5 showed improvement in bitumen recovery and separation efficiency at the 0.1 lb/ton dosage over the baseline containing no reagent.

Example 9

Filtration of High Grade (HG) Oil Sand Using Maillard Reaction Products from Examples 5 and 6

Table 3 presents the results of filtering the recovered solids from the floatation of HG oil sands. HG oil sand and Maillard Reaction Product were added to process water to obtain a binder dosage of 0.1 lb/ton of solids. The treated slurry (approximately 1 L, constituting the contents of a 1 L flotation cell) was vacuum filtered using a Buchner funnel (10.25" diameter, with a paper filter, Ahlstrom 6130-3300). The amount of water that that passed through the filter over time for each test is reported below in Table 4. The final value represents the water collected when as much that could be filtered was filtered, and this occurred at different times for the different runs.

TABLE 3

| Elapsed Filtration Time (min) | Untreated Control (Baseline) (cumulative grams of filtered water) | Example 5 (0.1 lb/ton) (cumulative grams of filtered water) | Example 6 (0.1 lb/ton) (cumulative grams of filtered water) |
|---|---|---|---|
| 2 | 5 | 10 | 50 |
| 4 | 10 | 20 | 142 |
| 8 | 60 | 40 | 230 |
| 16 | 188 | 128 | 295 |
| 32 | 252 | 260 | 368 |
| Complete Filtration | 388 | 420 | 435 |

The resulting filter cake was also analyzed for its wet weight and dry weight (by drying overnight in a 300° F. oven) and then the absolute moisture content and the percentage moisture was determined. Better performance is indicated by a larger amount of water passing through the filter, a larger dry weight of the filter cake and a lower percentage of moisture in the filter cake.

The following table (Table 4) details the flotation performance.

TABLE 4

| Filter Cake Property | Baseline Filter Cake | Example 5 Filter Cake | Example 6 Filter Cake |
|---|---|---|---|
| Wet Mass (g) | 439.1 | 462.9 | 446.5 |
| Dry Mass (g) | 343.8 | 361.6 | 353.5 |
| Mass Water (g) | 95.3 | 101.3 | 93 |
| Moisture % | 21.7 | 21.88 | 20.83 |

In another embodiment, the present invention is described as:

1. A process for obtaining a valued material from an aqueous suspension, dispersion or solution containing the valued material comprising adding to the aqueous suspension, dispersion or solution a Maillard reaction product, the Maillard reaction product comprising an adduct of (1) an amine reactant and (2) a reducing sugar, a reducing sugar equivalent, or a mixture thereof.
2. A flotation process for separating a valued material from an aqueous suspension or dispersion containing the valued material comprising adding to the aqueous suspension or dispersion a Maillard reaction product of (1) an amine reactant and (2) a reducing sugar, a reducing sugar equivalent, or a mixture thereof.
3. A process for emulsifying a material comprising agitating the material in a suitable liquid in the presence of a Maillard reaction product, the Maillard reaction product comprising an adduct of (1), an amine reactant and (2) a reducing sugar or a reducing sugar equivalent, or a mixture thereof.
4. A process for reducing corrosion comprising contacting a material in need of corrosion protection with a Maillard reaction product, the Maillard reaction product comprising an adduct of (1), an amine reactant and (2) a reducing sugar or a reducing sugar equivalent, or a mixture thereof.
5. A process for suppressing airborne dust comprising contacting a dust generating surface with a Maillard reaction product, the Maillard reaction product comprising an adduct of (1), an amine reactant and (2) a reducing sugar or a reducing sugar equivalent, or a mixture thereof.
6. A process of slow release fertilization comprising applying a high nitrogen containing Maillard reaction product to soil, the high nitrogen Maillard reaction product comprising an adduct of (1), a high nitrogen amine reactant and (2) a reducing sugar or a reducing sugar equivalent, or a mixture thereof.
7. A process for reducing the viscosity of a cementitious slurry comprising adding a Maillard reaction product to the slurry, the Maillard reaction product comprising an adduct of (1) an amine reactant and (2) a reducing sugar or a reducing sugar equivalent, or a mixture thereof.
8. A Maillard reaction product formed by reacting (1) an amine reactant and (2) a reducing sugar or a reducing sugar equivalent, or a mixture thereof, wherein the amine reactant is selected from a fatty amine.
9. A Maillard reaction product formed by reacting (1) an amine reactant and (2) a reducing sugar or a reducing sugar equivalent, or a mixture thereof, wherein the Maillard reaction product has high cationic functionality.
10. A Maillard reaction product formed by reacting (1) an amine reactant and (2) a reducing sugar or a reducing sugar equivalent, or a mixture thereof, wherein the Maillard reaction product has sulfur functionality.
11. A Maillard reaction product formed by reacting (1) an amine reactant and (2) a reducing sugar or a reducing sugar equivalent, or a mixture thereof, wherein the Maillard reaction product has phosphorus functionality.
12. A Maillard reaction product formed by reacting (1) an amine reactant and (2) a reducing sugar or a reducing sugar equivalent, or a mixture thereof, wherein the Maillard reaction product has sulfate or sulfonate functionality.
13. A Maillard reaction product formed by reacting (1) an amine reactant and (2) a reducing sugar or a reducing sugar equivalent, or a mixture thereof, wherein the Maillard reaction product has hydroxamic acid functionality.
14. A Maillard reaction product formed by reacting (1) an amine reactant and (2) a reducing sugar or a reducing sugar equivalent, or a mixture thereof, wherein the Maillard reaction product has silane functionality.
15. A Maillard reaction product formed by reacting (1) an amine reactant and (2) a reducing sugar or a reducing sugar equivalent, or a mixture thereof, wherein the Maillard reaction product has phenolic functionality.
16. A Maillard reaction product formed by reacting (1) an amine reactant and (2) a reducing sugar or a reducing sugar equivalent, or a mixture thereof, wherein the Maillard reaction product has aza crown chelating functionality Other aspects, advantages and modifications will be apparent to those skilled in the art to which the invention pertains, and these aspects and modifications are within the scope of the invention, which is limited only by the appended claims.

What is claimed is:

1. A flotation process for separating a valued material from an aqueous suspension or dispersion containing the valued material comprising adding to the aqueous suspension or dispersion a Maillard reaction product of (1) an amine reactant and (2) a reducing sugar, wherein a molar ratio of the reducing sugar to the amine reactant is about 1:1 to about 3:1.
2. The flotation process of claim 1, wherein the reducing sugar is selected from the group consisting of: dextrose, fructose, high fructose corn syrup, dihydroxyacetone, erythrulose, ribulose, xylulose, psicose, sorbose, tagatose, glyceraldehyde, erythrose, threose, ribose, arabinose, xylose, allose, altrose, mannose, gulose, galactose, talose, maltose, cellobiose, lactose, and gentiobiose, and wherein the amine reactant is selected from the group consisting of: ammonia, ammonium hydroxide, hydrazine, guanidine, primary amines, secondary amines, quaternary ammonium compounds, polyamines, amino acids, and proteins.
3. The flotation process of claim 1, wherein an atomic carbon:nitrogen ratio and degree of unsaturation of the Maillard reaction product increases as a reaction temperature and a reaction time are increased.
4. The flotation process of claim 1, wherein the Maillard reaction product is produced by reacting (1) the amine reactant, (2) the reducing sugar, and (3) a non-carbohydrate polyhydroxy reactant.
5. The flotation process of claim 4, wherein the non-carbohydrate polyhydroxy reactant is selected from the group consisting of: trimethylolpropane, glycerol, pentaerythritol, partially hydrolyzed polyvinyl acetate, fully hydrolyzed polyvinyl acetate, and mixtures thereof.
6. The flotation process of claim 1, wherein the Maillard reaction product is formed by reacting (1) the amine reactant and (2) the reducing sugar under Maillard reaction conditions.
7. The flotation process of claim 1, wherein the Maillard reaction product is formed by reacting (1) the amine reactant, (2) the reducing sugar, and (3) a polycarboxylic acid, wherein the Maillard reaction product in an aqueous medium has a pH of about 2 to about 6.
8. The flotation process of claim 1, wherein the Maillard reaction product comprises melanoidins.
9. The flotation process of claim 1, wherein the valued material is selected from the group consisting of: bitumen, one or more minerals, one or more metal ores, and coal.
10. The process of claim 1, wherein the Maillard reaction product further comprises a polysaccharide.
11. The process of claim 1, wherein the reducing sugar is maltose or lactose.
12. The process of claim 1, wherein the Maillard reaction product is in an aqueous medium has a pH of about 2 to about 4.
13. The process of claim 1, wherein the Maillard reaction product is in an aqueous medium has a pH of about 7.3.
14. The process of claim 1, wherein the reducing sugar is high fructose corn syrup.
15. The flotation process of claim 1, wherein the reducing sugar contains an aldehyde moiety reactive with $Cu^{+2}$ to produce a carboxylic acid moiety.
16. A flotation process for separating a valued material from an aqueous suspension or dispersion containing the valued material comprising adding to the aqueous suspension or dispersion a Maillard reaction product of (1) an amine reactant and (2) a monosaccharide, wherein a molar ratio of the monosaccharide to the amine reactant is about 1:1 to about 3:1.
17. The flotation process of claim 16, wherein the monosaccharide is selected from the group consisting of: a triose, a tetrose, a pentose, a hexose, a heptose, and a combination thereof.
18. The flotation process of claim 16, wherein the monosaccharide is selected from the group consisting of: dextrose, fructose, erythrulose, ribulose, xylulose, psicose, sorbose, tagatose, erythrose, threose, ribose, arabinose, xylose, allose, altrose, mannose, gulose, galactose, and talose, and wherein the amine reactant is selected from the group consisting of: ammonia, ammonium hydroxide, hydrazine, guanidine, primary amines, secondary amines, polyamines, and amino acids.
19. The flotation process of claim 16, wherein the monosaccharide is dextrose and the amine reactant is ammonia.
20. A flotation process, comprising:
adding a Maillard reaction product to an aqueous suspension or dispersion containing a value material to produce a treated mixture, wherein the Maillard reaction product is formed by reacting an amine reactant and a reducing sugar, and wherein a molar ratio of the reducing sugar to the amine reactant is about 1:1 to about 3:1;

forming a relatively hydrophobic fraction that floats to a surface of the treated mixture and a relatively hydrophilic fraction that sinks to a bottom of the treated mixture; and recovering a value material containing product from either the hydrophobic fraction, the hydrophilic fraction, or both.

21. The method of claim 20, wherein the formation of the relatively hydrophobic fraction and the relatively hydrophilic fraction is aided by passing air through the treated mixture, agitating the treated mixture, or a combination thereof.

22. The method of claim 20, wherein the value material is selected from the group consisting of: bitumen, one or more minerals, one or more metal ores, and coal.

23. The method of claim 20, wherein the reducing sugar is selected from the group consisting of: dextrose, fructose, high fructose corn syrup, dihydroxyacetone, erythrulose, ribulose, xylulose, psicose, sorbose, tagatose, glyceraldehyde, erythrose, threose, ribose, arabinose, xylose, allose, altrose, mannose, gulose, galactose, talose, maltose, cellobiose, lactose, and gentiobiose, and wherein the amine reactant is selected from the group consisting of: ammonia, ammonium hydroxide, hydrazine, guanidine, primary amines, secondary amines, quaternary ammonium compounds, polyamines, amino acids, and proteins.

24. The method of claim 20, wherein the Maillard reaction product is formed by reacting the amine reactant, the reducing sugar, and a polycarboxylic acid.

25. The method of claim 20, wherein the Maillard reaction product is formed by reacting the amine reactant, the reducing sugar, and a polycarboxylic acid under Maillard reaction conditions, and wherein the amine reactant comprises ammonium hydroxide, the reducing sugar comprises dextrose, and the polycarboxylic acid comprises citric acid.

26. The method of claim 20, wherein the Maillard reaction product comprises melanoidins.

27. A flotation process for separating a valued material from an aqueous suspension or dispersion containing the valued material comprising adding to the aqueous suspension or dispersion a Maillard reaction product of (1) an amine reactant and (2) a reducing sugar, wherein a molar ratio of the reducing sugar to the amine reactant is about 1:1 to about 3:1, and wherein the Maillard reaction product is present in an amount of about 0.0005 to 0.05 part by weight of the total solids of the aqueous suspension or dispersion.

* * * * *